United States Patent [19]

Henry

[11] 4,440,322

[45] Apr. 3, 1984

[54] DISPENSER FOR NUTS OR THE LIKE

[76] Inventor: Joseph D. Henry, 2728 E. Huntington, Duarte, Calif. 91010

[21] Appl. No.: 425,298

[22] Filed: Sep. 28, 1982

[51] Int. Cl.³ ............................................. G01F 11/10
[52] U.S. Cl. .................................. 222/153; 222/361; 141/386
[58] Field of Search ............... 222/153, 314, 328, 344, 222/361, 345, 346, 348, 359; 221/264

[56] References Cited

U.S. PATENT DOCUMENTS

| 2,104,445 | 1/1938 | Ayars | 221/265 |
| 3,101,872 | 8/1963 | Dickinson | 221/265 |
| 3,563,417 | 2/1971 | Jordon et al. | 222/189 |

FOREIGN PATENT DOCUMENTS

| 19244 | 9/1934 | Australia | 222/361 |
| 594472 | 2/1945 | United Kingdom | 222/361 |

Primary Examiner—H. Grant Skaggs
Attorney, Agent, or Firm—Eric P. Schellin; H. K. Saalbach

[57] ABSTRACT

A transparent dispenser for nuts or the like having a movable slide which, by its movement, transfers a measured volume from the bottom of a hopper to a delivery chute. The upper wall of the slide chamber is partly relieved so as to prevent jamming of the slide.

5 Claims, 2 Drawing Figures

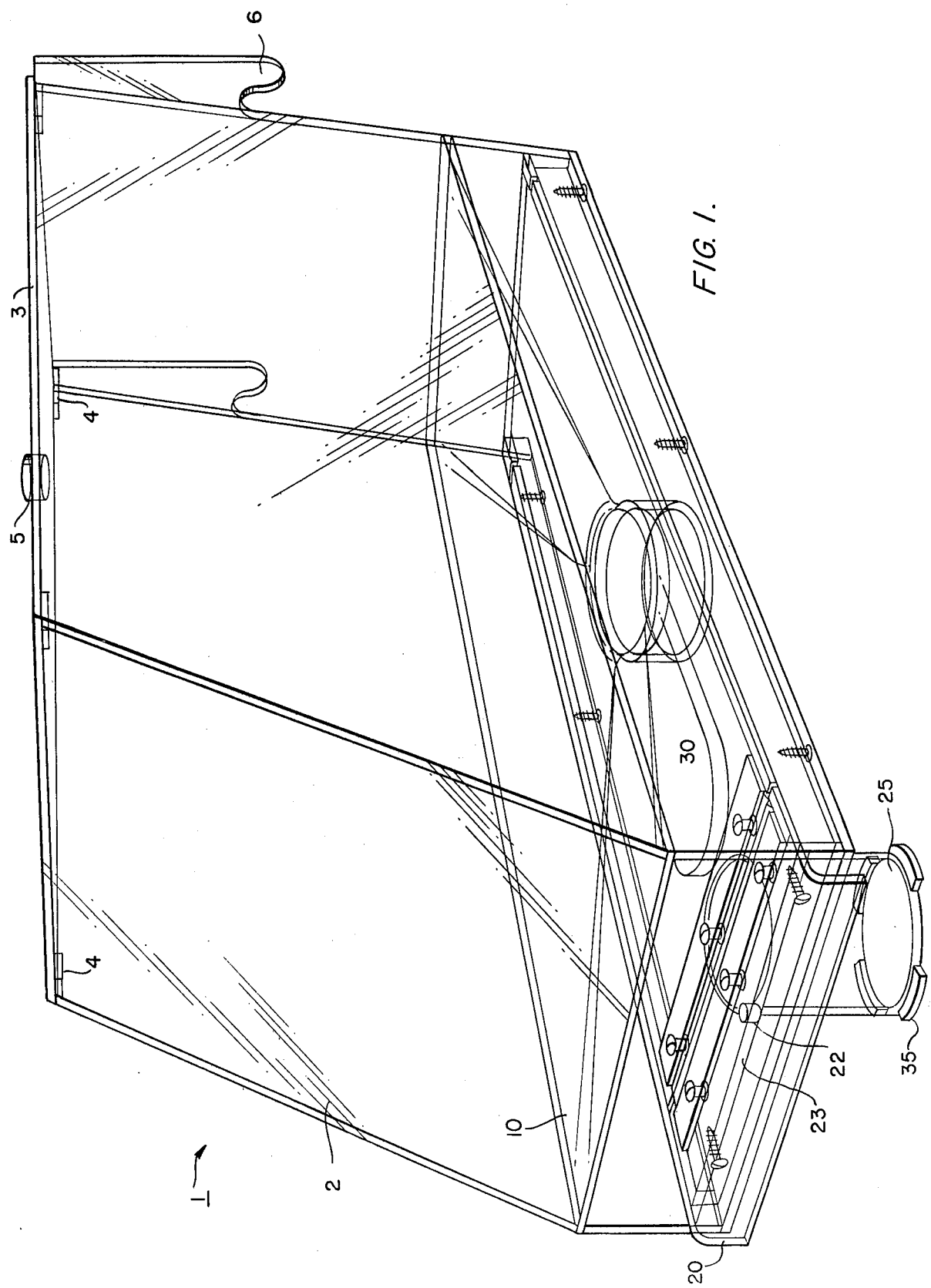

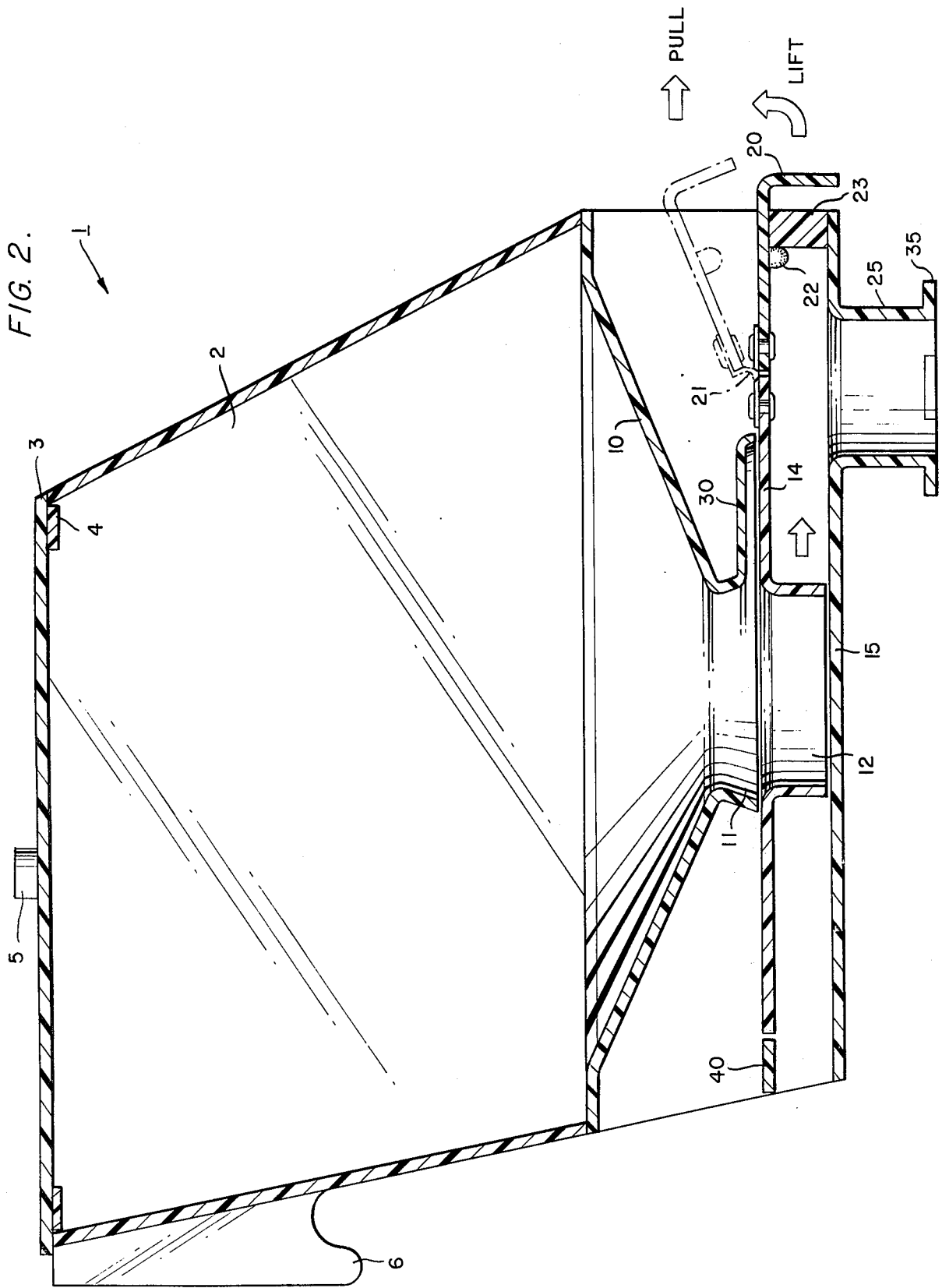

DISPENSER FOR NUTS OR THE LIKE

SUMMARY

A dispenser for nuts or the like so constructed of transparent plastic to permit viewing of the contents. A slide, when pulled forward, transfers a measured volume of nuts or the like from the bottom of a hopper to a delivery chute. The handle which pulls the chute forward must first be lifted to disengage a catch before the handle can be pulled forward to draw the slide forward. The slide moves in a closely fitted chamber, whose upper wall is partly relieved to prevent jamming of the slide.

THE DRAWINGS

FIG. 1 is a perspective view, taken from the front quarter, of the dispenser.

FIG. 2 is a front-to-rear-vertical cross-sectional view of the dispenser.

DETAILED DESCRIPTION

The nut or the like dispenser 1 of this invention is made of transparent plastic, as evident from FIG. 1. Thus, the nuts being sold in a store or available in a home kitchen, as well as the working parts of the dispenser, are clearly seen.

This promotes a feeling of cleanliness by the user. Furthermore the nuts are available without the hazard of grubby hands prying them out.

The nuts are stored in the hopper 2, which is closed at the top by removable lid 3, kept from sliding off by locating bosses 4.

The dispenser is adapted to be hung by ears 6, which project from the back side, from a rod or pipe, not shown. A support bar, not shown, located below the rod or pipe, presses against and supports the dispenser so that the dispenser hangs stably from the rod or pipe, without swinging downwardly around it. This arrangement permits a number of similar dispensers to be mounted in a row and in adjacent side-to-side contact, so as to save space. Yet any one dispenser can be readily removed from the row for refilling.

The bottom of hopper 2 is provided with a funnel 10 which permits the items in hopper 2 to gravitate to gate 11 (FIG. 2), through which the items fall into measuring cup 12 of a transfer slide 14. The gate 11 has a conical configuration which diverges downwardly so as to prevent jamming. The bottom of the measuring cup 12 is closed by bottom plate 15. The transfer slide 14 is articulated to a pull-handle 20 by means of hinge 21. When the pull-handle 20 is lifted, the catch 22 is lifted above the ledge 23, so that the handle can then be pulled outwardly (to the right in FIG. 2) to slide measuring cup 12 along bottom plate.

As measuring cup 12 moves further to the right in FIG. 2 it eventually passes over chute 25 and items in measuring cup 12 start to fall through the chute 25. At this moment the leftmost side of measuring cup 12 is still open to gate 11. However, items in hopper 2 do not fall directly through gate 11, measuring cup 12 and chute 25 because the items are not fluids. Instead, they are solids which have a natural angle of repose, which has such a slope as to prevent direct sliding through the gate 11 to chute 25.

The gate 11 is provided with an extended lip 30, extending in a forward direction, to provide additional clearance for the objects pulled forward in the measuring cup 12 when the transfer slide is pulled forward. The size of the clearance space between the top of transfer slide 14 and the bottom of the extended lip 30 is, however, not sufficient to permit one of the objects being dispensed to find its way thereinto. The use of the extended lip 30 avoids the problem of the transfer slide jamming between the bottom of gate 11 and the top of bottom plate 15.

The bottom of chute 25 is provided with radially extending members 35 which can be used to support a receptacle, such as a bag with a drawstring or a container with a cooperating bayonet coupling.

When the handle 20 is placed back in stowed position, the stop 40 (FIG. 2) prevents the handle 20 from being pushed back so far that it would be difficult for the user to get his finger under it to lift it.

The entire dispenser 1 is constructed as an integral one piece unit except for the transfer slide 14 and the bottom plate 15. Thus, the transfer slide can always be removed by unscrewing the screws, seen in FIG. 1, which hold the bottom plate 15 to the rest of dispenser 1.

The dispenser described herein is adapted to dispense objects such as nuts, dried peas or beans and candy corn, which are of approximately the same size, considerably smaller than the size of the measuring cup.

I claim:

1. A dispenser of small objects of similar size comprising:
   a hopper for said objects having a top opening;
   a lid adapted to close said opening and fitted thereto;
   said hopper having a funnel shaped bottom leading downwardly to a circular gate;
   said gate having further a conical extension which diverges downwardly and which ends in a lower edge which is everywhere in the same horizontal plane;
   a transfer slide mounted for limited horizontal movement immediately adjacent the lower edge of said gate;
   a bottomless measuring cup formed in said transfer slide of such size and so located as to be in register with said gate when said transfer slide is in one of its limits of movement;
   a horizontal stationary bottom plate located immediately adjacent the lower edge of said measuring cup;
   said horizontal bottom plate having an opening herein of such size and so located as to be in register with said bottomless measuring cup when said transfer slide is in its other limit of movement;
   a chute depending from the edges of the said opening in said bottom plate;
   handle means articulated to said transfer slide whereby said transfer slide may be manually moved horizontally between its limits of motion;
   said handle means being provided with catch means, which must be released by lifting the handle, before the handle means can be used to move said transfer slide.

2. The dispenser of claim 1 in which:
   said chute is provided, along its outer lower edges, with a series of outwardly extending spaced projections.

3. The dispenser of claim 1 in which:
   said hopper, said transfer slide, said bottom plate and said chute are transparent.

4. The dispenser of claim 1 in which:
the conical extension of said gate further has a lip region, the lower edge of which is extended to slightly overlie the said opening in said bottom plate, with the remaining portion of said lip raised slightly above and parallel to said horizontal plane, whereby the action of dispensing by movement of said transfer slide is render jam-free.

5. The dispenser of claim 4 in which:
said gate, said bottomless measuring cup, and said opening are large in comparison with said small objects.

* * * * *